(12) United States Patent
Harper

(10) Patent No.: US 7,878,399 B2
(45) Date of Patent: Feb. 1, 2011

(54) SYSTEMS AND METHODS FOR ACQUIRING MEDIA ASSETS

(75) Inventor: Gregory W. Harper, New York, NY (US)

(73) Assignee: Trans World New York LLC, Albany, NY (US)

( * ) Notice: Subject to any disclaimer, the term of this patent is extended or adjusted under 35 U.S.C. 154(b) by 381 days.

(21) Appl. No.: 12/114,980

(22) Filed: May 5, 2008

(65) Prior Publication Data
US 2008/0308626 A1 Dec. 18, 2008

Related U.S. Application Data

(60) Provisional application No. 60/916,133, filed on May 4, 2007.

(51) Int. Cl.
*G06K 7/10* (2006.01)
(52) U.S. Cl. ................... 235/462.01; 235/375
(58) Field of Classification Search ........... 235/462.01, 235/375, 380, 487, 441, 492
See application file for complete search history.

(56) References Cited

U.S. PATENT DOCUMENTS

| | | | | |
|---|---|---|---|---|
| 7,440,286 | B2 * | 10/2008 | Hiew et al. ................. | 361/737 |
| 2006/0168507 | A1 * | 7/2006 | Hansen .................... | 715/500.1 |
| 2007/0045417 | A1 * | 3/2007 | Tsai et al. ................. | 235/441 |
| 2007/0156443 | A1 * | 7/2007 | Gurvey .................... | 705/1 |
| 2007/0233601 | A1 * | 10/2007 | Nakada et al. ............. | 705/51 |
| 2008/0046751 | A1 * | 2/2008 | Choi ....................... | 713/185 |

* cited by examiner

*Primary Examiner*—Edwyn Labaze
(74) *Attorney, Agent, or Firm*—Rothwell, Figg, Ernst & Manbeck, P.C.

(57) ABSTRACT

In one aspect, the invention provides a device for facilitating the acquisition of media assets. In some embodiments, the device includes: a housing; a USB connector projecting outwardly from an end of the housing; a card reader housed in the housing; non-volatile memory housed in the housing and coupled to the USB connector and the card reader; and a barcode disposed on a major surface of the housing, said barcode encoding an identifier that is associated with customer information.

4 Claims, 3 Drawing Sheets

SYSTEMS AND METHODS FOR ACQUIRING MEDIA ASSETS

This application claims the benefit of U.S. Provisional Patent Application No. 60/916,133, filed on May 4, 2007, the entire contents of which are incorporated herein by reference.

BACKGROUND

1. Field of the Invention

The present invention relates to systems and methods for acquiring media assets (e.g., MP3 files, MOV files or other media assets).

2. Discussion of the Background

Today many cell phones have the capability to play music files in the MP3 format. While playing the file is relatively easy getting the music onto the phone is often tricky and varies tremendously from phone to phone. Not only do phones from each manufacturer use proprietary cables to connect the phone to the PC, often even phones from the same manufacturer use different cables. Increasingly however phones from varying manufacturers are making use of a common memory card format call micro SD. Other forms of memory cards are also in use but the total number of formats is less than 5 with Micro SD, Mini SD, Memory Stick Micro and standard SD cards being the most common. One issue with these cards is that the cards are very small and easily dropped while inserting or removing them from a phone. Card readers do exist for these cards but typically the mobile cards like the micro SD card is first put into an adaptor that transforms the card into an SD card size. Then the SD card is inserted into an SD card reader which is then plugged into the standard USB port on a computer.

To be able to deliver content to a cell phone at retail, a number of challenges emerge—First to have an individual cable set for each manufacturer of cell phones and then specific cables for each phone results in an impractical configuration. To add to the confusion, even if a cable could be provided, each phone has different software that would have to be initiated to enable the phone to interface to an in store Kiosk and thus initiate the delivery of content. One solution would be to deliver the content first to the phone's memory card. This then brings up the issue of the card size and the high potential of dropping and loosing the memory card.

SUMMARY

In one aspect, the invention provides a portable device that may functions as a media asset transfer device and/or shopping card (e.g. a loyalty card). In some embodiments the portable device includes: memory (e.g., flash memory), a built-in memory card reader and a USB interface or other interface for enabling communication with a computer or other separate device. In some embodiments, the memory may store information related to a customer account (e.g., an account number). Additionally, in some embodiments, a barcode may be placed on an outer-surface of the device, which barcode may encode information that is associated with the customer account.

The above and other embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION OF PREFERRED EMBODIMENTS

As used herein, the words "a" and "an" mean "one or more."

Figure 1:
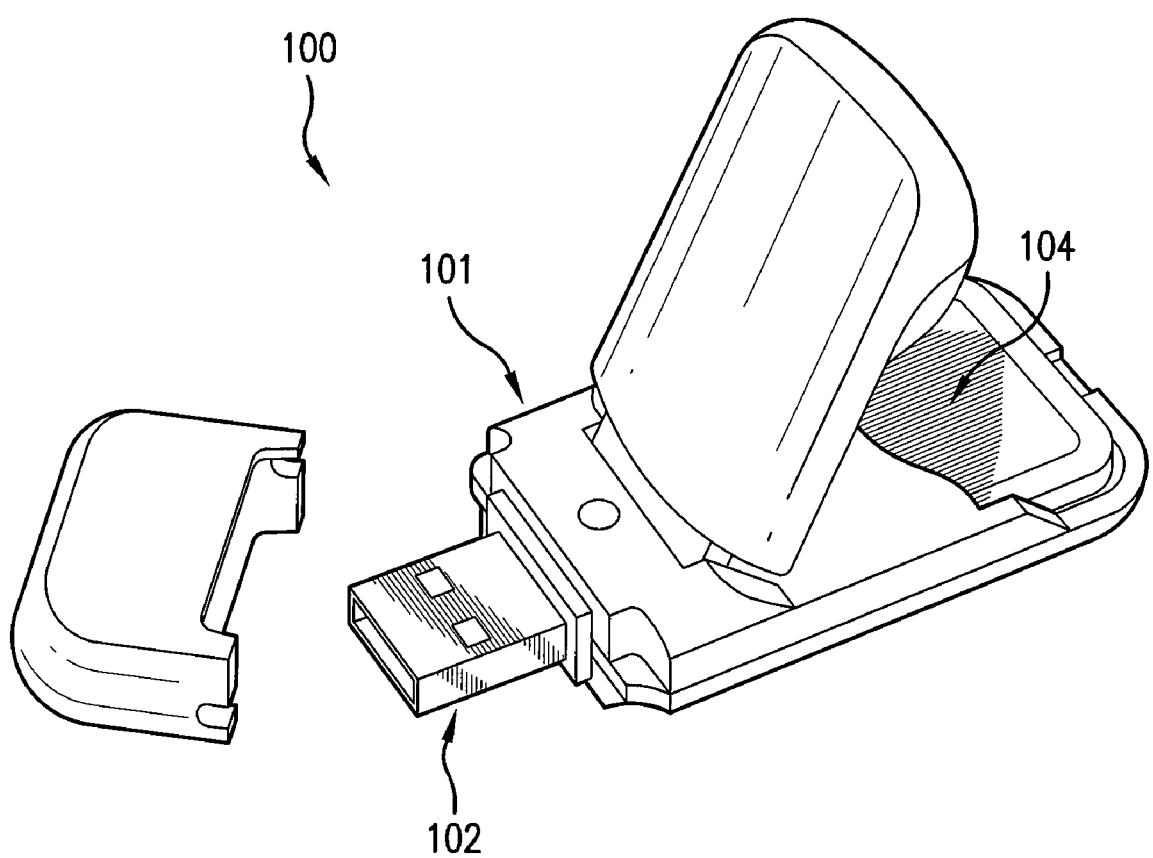
FIG. 1. illustrates a portable device comprising built-in memory (e.g., flash memory) and a built-in memory card reader.

FIG. 1 illustrates a portable device 100, according to an embodiment of the invention, for acquiring media assets. As shown in FIG. 1, portable device 100 resembles a thumb drive device or "flash drive" (i.e., it is small—about the size of a thumb), and may include a housing 101, a standard USB connector 102 (or other connector) projecting outwardly from one end of housing 101, and a card reader 104 having a slot for receiving various memory cards, which card reader is housed in housing 101. Although not shown in FIG. 1, device 100 may include memory (e.g., 1 G flash memory) that is housed within housing 101 and coupled to connector 102 and reader 104.

Device 100 may be sold or given to frequent shoppers and may also include an identifier to allow the card to be used as an identifier for a frequent shopping or loyalty program.

USB connector 102 may be a standard USB 1.0/2.0 connector. Device 100 is self mounting when connected to a PC and the memory component of device 100 would show up on the PC as a removable drive with a drive letter allocated by the computer. Typically, in a system with a hard drive (c:) and an optical drive (d:), the memory component of device 100 would show up as an "(e:)" drive. In some embodiment, the memory component of device 100 may have both a hidden folder for access by an in-store POS system as well as an open folder for saving music or video or other media assets vended from, for example, an in-store kiosk.

As discussed above and shown in FIG. 1, in addition to device 100 including internal memory, device 100 may also include an integrated card reader 104. Following the above example, any memory card, such as a card from a cell phone, placed into this reader 104 would show up as an "(f:)" drive or other drive when device 100 is connected to the PC. Device 100 would pass power from the USB connector to the reader 104 and have the appropriate software to recognize and mount the card.

Figure 2:
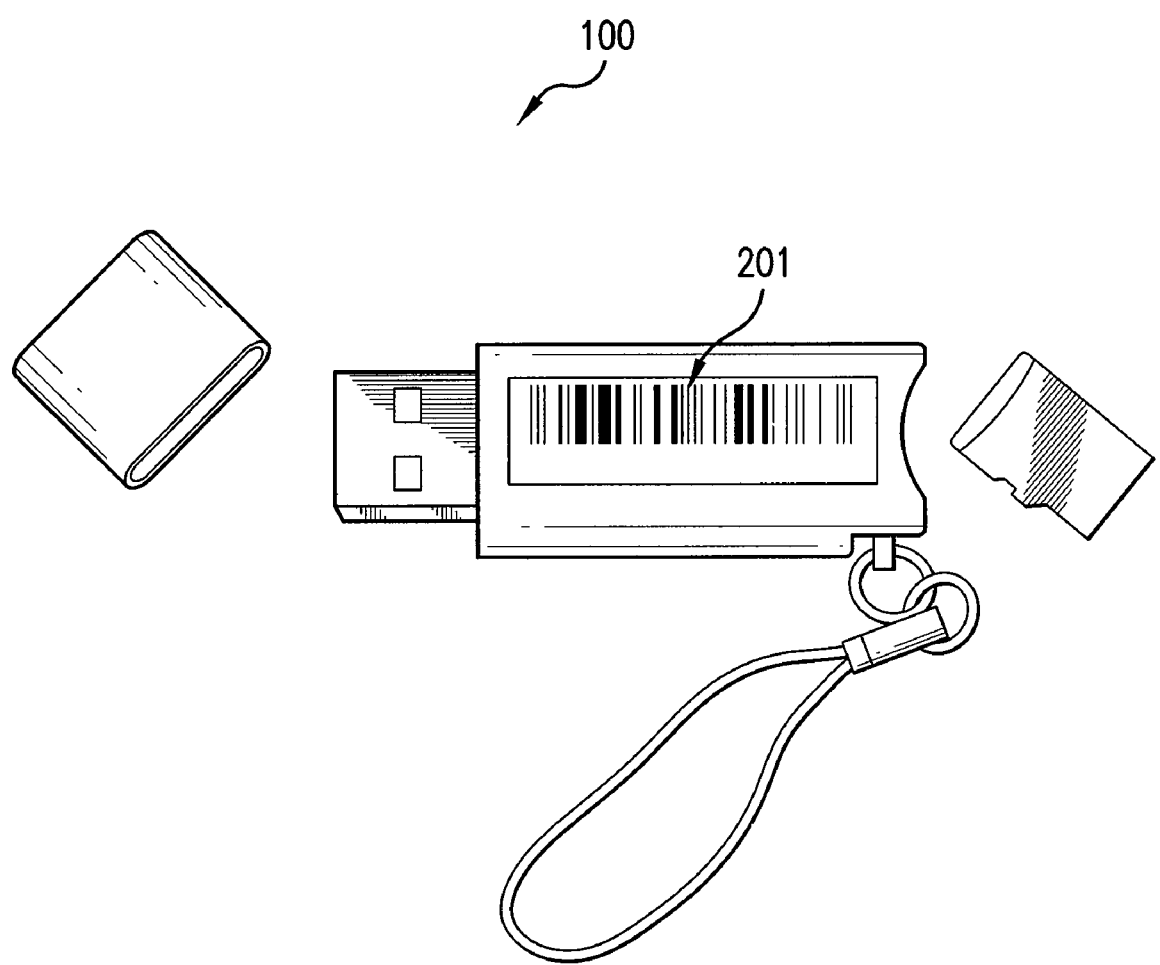
FIG. 2 illustrates the portable device having a barcode placed thereon.

In some embodiments, device 100 may have a unique identifier associated therewith (e.g., an identifier associated with a customer account or loyalty program). This identifier can be used as a part of a store loyalty program. For example, a barcode 201 that encodes the identifier may be printed (or otherwise placed) on a surface of the unit (see FIG. 2). Other physical identifying technologies can also be used instead of or in conjunction with the bar code, such as Near Field Communication (NFC) technology or Radio Frequency Identification (RFID). These alternative technologies would also have a unique identifier coded into them.

When a device 100 is provided to a customer, its unique identifier is read (e.g., if it has a barcode, a sales clerk may scan the barcode) and associated with that customer. For example, after the identifier is read from device 100, the identifier may be placed into a user configuration file, user profile or other data record that contains information about the customer. This customer information could include, but is not limited to, information such as name, address, date of birth, email address as well as preferences for genres of content etc. If no such user record exists, one may be created. The record that is created may be stored in a CRM system as well as copied into a hidden folder stored in the memory component of device 100.

Device 100 may also be used as a stored value instrument and could be loaded with funds/points to enable the purchase of media assets. For security and to prevent fraud, the funds/points may be encrypted or otherwise protected from tampering.

Figure 3:
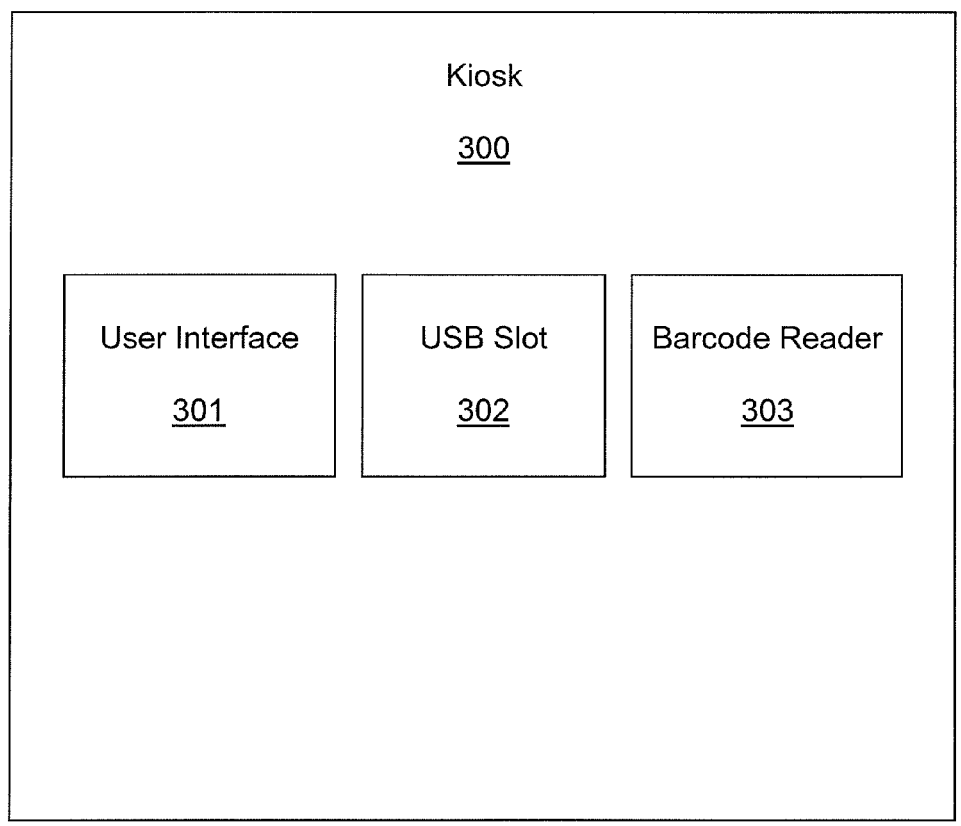
FIG. 3 illustrates a kiosk according to an embodiment of the invention.

After a device 100 is provided to a customer and associated with the customer as described above, the customer may use device 100 to obtain media assets (e.g., tracks from a CD, videos, games or other media assets). For example, the customer may use a "kiosk" 300 (i.e., any device that enables the user to select media assets) to search for and sample media assets (see FIG. 3). When the user finds a media asset he or she is interested in acquiring, the user can add that content to a virtual shopping cart, as is well known in the art. When the user has finished the shopping experience (i.e., adding content to the cart) the user may proceed to checkout the cart by, for example, activating a "checkout" button displayed on a user interface 301 of the kiosk 300. In response to this action by the user, the kiosk 300 may instruct the user to insert USB connector 102 of device 100 into a USB slot 302 of the kiosk 300, if the user has not already done so.

If the kiosk 300 has checkout capability (e.g., the ability to store media assets onto device 100), the kiosk may first verify the storage capacity of the memory component of device 100 and/or the storage capacity of a memory card inserted into card reader 104 to determine if there is sufficient capacity to load the media assets that are in the user's shopping cart to a storage unit of device 100 (i.e., the memory component of the memory card). If there is not sufficient capacity, kiosk 300 may inform the user that the device 100 is full and the transaction must end.

But, if there is sufficient capacity and the kiosk 300 has the capability to accept payment (e.g., the kiosk 300 has a credit card swipe device or the like or other device for receiving payment), then a payment dialogue may be presented prompting the user to authorize payment or insert payment for the selected media assets. Once the purchase transaction has been completed and verified (e.g., after the user swipes his credit card and the card is verified or after it is determined that there is a sufficient amount of stored funds/point stored in device 100 or after the user inserts payment), the kiosk 300 may store a copy of the purchased media assets onto a storage unit of device 100 (e.g., a memory card inserted into the card reader of device 100) together with a digital receipt.

If the kiosk 300 does not have a payment capability, but has a USB slot 302, then, instead of initiating the payment dialogue, the kiosk 300 may store a digital token on the memory card or other storage unit in device 100 and/or may store onto a storage unit of device 100 a copy of the purchased assets in a locked form so that, even though the media assets are stored in device 100, they can not be fully enjoyed (e.g., they can not be played at all or can be played only a few times or less) until the user pays for the assets. After storing the token and/or assets in locked form (e.g., encrypted form) in device 100, the kiosk 300 may prompt the user to then take device 100 to a point-of-sale device (e.g., a checkout counter having a POS device) having a USB port.

After the user connects USB connector 102 of device 100 to a USB port of the POS device, the POS determines the media assets that the user desires to purchase. For example, the POS may read the token that was stored in device 100 by the kiosk 300, which token my include an identifier that identifies the customers cart so that the POS system can determine the contents the customer placed in the cart or, for each media asset placed in the cart, the token may include an identifier that identifies the media asset. Alternatively, the POS device may read barcode 201 and use read data to determine the assets. Next, if the media assets are not already stored in device 100, then the POS device, like the kiosk 300, may check to insure that there is sufficient data storage space on device 100 for the media assets. If there is sufficient space, then after the user tenders payment, the POS would transfer the media assets along with a digital receipt to device 100 much in the same manner as described above in connection with the kiosk 300. If the media assets are already stored in device 100 (e.g., stored in a locked form), then the POS device may unlock the assets after the user provides the required payment. The POS device need not be located in the retail store and may even be implemented on the user's home computer or on a website that the user access using his/her home computer.

In the case where the kiosk 300 does not have a USB port, then the user may be instructed to proceed to a POS station with device 100 when the user is ready to make payment and acquire the media assets placed in the cart. In such an embodiment, the device's unique identifier (e.g., barcode) is associated with the user's shopping cart so when the device is scanned or inserted at the POS location for payment the device's unique identifier can be used to retrieve the cart. For example, when the user activates a "checkout" button (or other user interface element displayed on a display device of the kiosk), the kiosk 300 may prompt the user to position device 100 so that a barcode reader (a.k.a., barcode scanner) 303 of kiosk 300 can read barcode 201, and, after reading the barcode, the barcode may be associated with an identifier identifying the user's cart. This may be accomplished by the kiosk 300 transmitting the barcode data to a server that stores the cart identifier, and the server, upon receiving the barcode data, can store the bar code data such that it is associated with the cart identifier. Once payment is received by the POS, the device could be loaded with the content and the digital receipt.

Regardless of how the payment was finally transacted, a storage unit in device 100 (e.g., a card inserted into the card reader or flash memory housed within the housing of device 100) would be loaded with content after receipt of funds. The user can then take the content back to his or her PC and plug the device into the PC (e.g., using the USB interface) and transfer the content to the PC in accordance with any Digital Rights Management (DRM) that may or may not be present. Because device 100 has a card reader/writer for various memory cards, the user may choose to insert a memory card into device 100 to copy the content onto the card. The customer could insert the phone memory card either at the time of initial purchase at the retail location or later at the home PC.

Because device 100 may include writable memory, user information may also be added to device 100 that would enable the kiosk 300 to read that user information and then customize a presentation based on this user information, which may include the user's previous or recent purchases or stated or observed preference. A points system could also be implemented whereby each time device 100 is used, points are added to the memory which when read might initiate a discount or special offer.

Another implementation of device 100 would be to use it to tell a kiosk 300 what the characteristics of the users media device might be. In this implementation, at signup, the type and model of a phone to which content may be transferred is inputted into the system. That information may then be checked against a database of capabilities of individual phones and the phone capability profile may be written to a memory unit of the device 100 or an identifier identifying the phone may be written to the memory. When the user goes to purchase media assets, the profile or phone identifier may be read by the kiosk 300 (or POS) and an appropriate file format may be written to a storage unit of the device 100 (e.g., the phone memory card through the device 100 card reader function). In this way only files that can be correctly played on the phone are transferred to device 100. The same profiling system can also be used to profile other home media players so if for example the users phone requires a different format than the users home media player both formats could be transferred to the device.

The digital receipt function can provide proof of purchase which may be especially important with non-DRM files that do not have a link back to a DRM server to verify the authenticity of the purchase.

A software program could also be implemented that would write user identifying information into the header or meta data portion of a non protected song so that if the song were passed to someone other than the original owner it would be obvious that the person using the content was not the legitimate owner.

There could also be an enhanced version of the device 100 that includes a rechargeable battery or other charge storage device (e.g., a capacitor). This enhanced version would have the ability to not only get information from a kiosk 300 and load it onto the device 100 but also since the unit was powered by a rechargeable battery the transfer to the phone memory could be accomplished without having to connect the device 100 to a host computer. This version of the device 100 may also have a micro-controller in addition to the battery, which micro-controller may be configured to automatically copy files from the device 100 main memory to a memory card inserted into the card reader of the device.

While various embodiments/variations of the present invention have been described above, it should be understood that they have been presented by way of example only, and not limitation. Thus, the breadth and scope of the present invention should not be limited by any of the above-described exemplary embodiments.

What is claimed is:

1. A device for facilitating the acquisition of media assets, the device comprising:
   a housing;
   a USB connector projecting outwardly from an end of the housing;
   a card reader housed in the housing;
   non-volatile memory housed in the housing and coupled to the USB connector and the card reader so that data received via said USB connector can be stored in said non-volatile memory and data stored in said non-volatile memory can be transferred to a card inserted into said card reader; and
   a barcode disposed on a major surface of the housing, said barcode encoding an identifier that is associated with customer information.

2. A method of using a device to acquire media assets, wherein the device comprises a housing, a USB connector projecting outwardly from an end of the housing, a card reader housed in the housing, non-volatile memory housed in the housing and coupled to the USB connector and the card reader so that data received via said USB connector can be stored in said non-volatile memory and data stored in said non-volatile memory can be transferred to a card inserted into said card reader, and a barcode disposed on a major surface of the housing, said barcode encoding an identifier that is associated with the user of the device, the method comprising:
   positioning the device relative to the kiosk so that a barcode scanner connected to the kiosk can scan the barcode;
   using a kiosk to select at least one media asset;
   inserting the device's USB connector into a compatible USB slot provided by the kiosk;
   using the kiosk to authorize or provide payment for the at least one media asset;
   after authorizing or providing the payment, receiving from the kiosk the at least one media asset and storing the at least one media asset on a card inserted into the card reader;
   removing the card from the card reader; and
   inserting the card into a media player device.

3. The method of claim 2, wherein the step of positioning the device is performed before the step of selecting the at least one media asset.

4. A method of using a device to acquire media assets, wherein the device comprises a housing, a USB connector projecting outwardly from an end of the housing, a card reader housed in the housing, non-volatile memory housed in the housing and coupled to the USB connector and the card reader, and a barcode disposed on a major surface of the housing, said barcode encoding an identifier that is associated with the user of the device, the method comprising:
   using a kiosk to select media assets;
   activating a user interface element displayed on a display device of the kiosk to indicate that a media asset selection process is complete;
   receiving a prompt from the kiosk to position the device so that the barcode can be read;
   positioning the device relative to the kiosk so that a barcode scanner connected to the kiosk can scan the barcode;
   after the scanner scans the barcode, taking the device to point-of-sale system, which uses the barcode to determine the selected media assets;
   inserting the device's USB connector into a compatible USB slot provided by the point-of-sale system;
   authorizing or providing payment for the selected media assets;
   after authorizing or providing the payment, receiving from the point-of-sale system the selected media assets and storing the media assets in the memory or on a card inserted into the card reader.

* * * * *